United States Patent
Kopf et al.

[11] Patent Number: 5,997,782
[45] Date of Patent: Dec. 7, 1999

[54] MULTI-COMPONENT COMPOSITE MATERIAL AND METHOD FOR PRODUCING A LAMINAR MULTI-COMPONENT COMPOSITE MATERIAL FROM A HALOGEN COMPOUND-FREE FLEXIBLE PLASTIC

[75] Inventors: Manfred Kopf, Dessau; Dietmar Helbig, Tannenbergstahl, both of Germany

[73] Assignee: "debolon" dessauer bodenbeläge GmbH, Germany

[21] Appl. No.: 08/664,688

[22] Filed: Jun. 17, 1996

Related U.S. Application Data

[63] Continuation of application No. PCT/EP95/04051, Oct. 14, 1995.

[30] Foreign Application Priority Data

Oct. 17, 1994 [DE] Germany .............................. 44 38 888
Apr. 26, 1996 [DE] Germany ............................ 196 16 862

[51] Int. Cl.$^6$ ....................................................... B29D 9/00
[52] U.S. Cl. ....................... 264/45.8; 264/46.2; 264/46.3; 264/46.4
[58] Field of Search ............................. 264/46.4, 54, 113, 264/126, 45.8, 46.2, 46.3

[56] References Cited

U.S. PATENT DOCUMENTS 5,407,617 4/1995 Oppermann et al. .................. 264/46.4

FOREIGN PATENT DOCUMENTS

| | | |
|---|---|---|
| 1062203 | 7/1959 | Germany . |
| 1619313 | 6/1967 | Germany . |
| 4114085 | 11/1992 | Germany . |
| 4127107 | 12/1992 | Germany . |
| 4313037 | 8/1994 | Germany . |
| 1150375 | 4/1969 | United Kingdom . |
| 2020576 | 11/1979 | United Kingdom . |
| 9503174 | 2/1995 | WIPO . |

*Primary Examiner*—Richard Weisberger
*Attorney, Agent, or Firm*—Londa and Traub LLP

[57] ABSTRACT

This invention is directed ro flexible plastic sheets of a thermoplastic material with a wear resistant surface, these sheets or panels have a monochromatic or multicolored or colored patterned design, especially in the area of manufacturing wear resistant floor coverings.

6 Claims, 3 Drawing Sheets

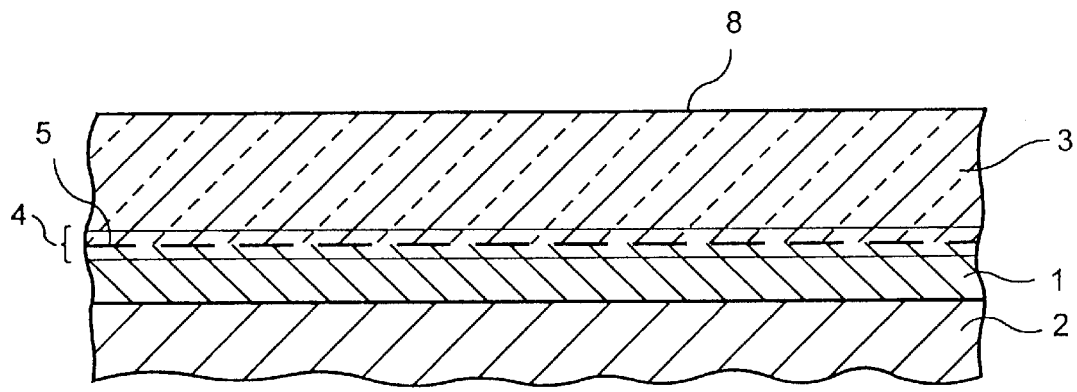
F I G. 1
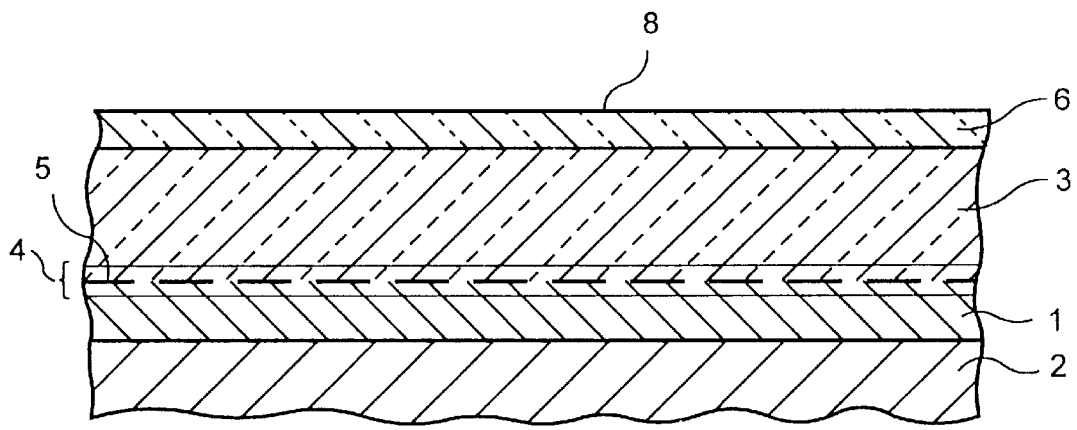
F I G. 2
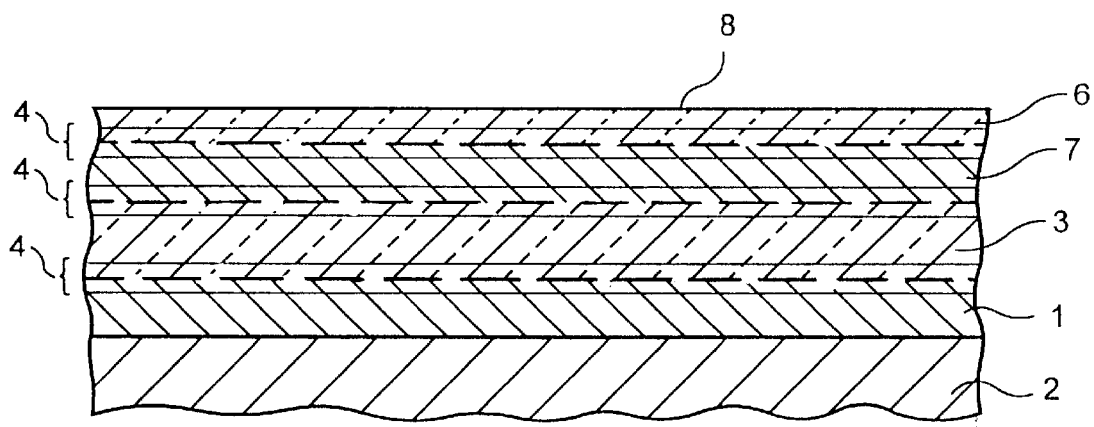
F I G. 3

MULTI-COMPONENT COMPOSITE MATERIAL AND METHOD FOR PRODUCING A LAMINAR MULTI-COMPONENT COMPOSITE MATERIAL FROM A HALOGEN COMPOUND-FREE FLEXIBLE PLASTIC

This application is a continuation application of PCT/EP95/04051 filed Oct. 14, 1995.

The invention is operative in the area of manufacturing cover-like, flexible plastic sheets or panels from a thermoplastic material with a wear-resistant surface, these sheets or panels having a monochromatic or multicolored or colored patterned design, especially in the area of manufacturing wear-resistant floor coverings, and relates to a multi-component composite construction of a floor covering of a PVC-free plastic and a method for producing a homogeneous, laminar multi-component composite material.

Polyvinylchloride or PVC in short, which is a thermoplastic material, is well known as a starting material for plastic floor coverings. When a plasticizer is added, it can be processed as soft PVC with fillers into a homogeneous, sheet-shaped floor covering. The good properties of this material, which is used as a tasteless and odorless powdery product, consist therein that it is difficult to ignite, has a low water absorption capability and good electrical insulation properties. Furthermore, PVC is distinguished by good processing properties and low material costs. When processed into products, the latter are resistant to many types of cleaning agents and solvents, which occur in the normal use of the product as a floor covering, and are not attacked by these. The floor covering, produced on the basis of PVC and consisting of plastic sheets, is physiologically satisfactory and distinguished by a wear-resistant surface, the abrasion resistance depending on the filler content. The surface can be colored in the manufacturing process and provided with a pattern. Furthermore, plastic PVC sheets can be processed easily into large-area products by welding.

Although the material properties of PVC fulfill many of the requirements for producing plastic sheets and also have advantages for the further processing, that is, for laying plastic sheets to form a surface-covering floor covering, the material has a deficiency—it contaminates the environment because of the high chlorine content. The plastic sheets are produced from a plasticizer-containing PVC. For this purpose, the PVC powder, before being processed, is mixed with a plasticizer, for example, to form a paste or a flowable dry blend, which is then gelled by heat to form a homogeneous composition. As plasticizer, various materials are used, which are more or less harmful to health, should any portions of them diffuse out of the processed material.

In order to avoid the deficiencies mentioned, various proposals have been made (DE 35 07 665 and EP 0 321 760), which are directed to the manufacture of plastic sheets from plasticizer-free materials. Homogeneous plastic sheets, which were said to have properties comparable to those prepared on the basis of PVC, are said to have been obtained with the manufacturing methods, which have become known. The objective could be reached only with respect to the use of a plasticizer-free end product. All products, produced with these methods, have the deficiency that a colored surface configuration, comparable to that of PVC material, cannot be attained and appreciable limitations with respect to wear resistance and increased costs during the laying process have to be accepted. The causes for these deficiencies lie in the properties of the materials used.

According to the known solutions of the problem, large amounts of ethylene vinyl acetate copolymer (EVA) are used as binder for the floor coverings. This material is too soft and sheets or panels, produced from this starting material are not suitable as floor covering. Furthermore, it is not easily possible to print this material.

The DE 41 14 085 A1 discloses a method for the production of PVC-free plastic sheets, which can be used as floor covering. The deficiency of the PVC-free material used, namely, an ethylene vinyl acetate copolymer, which has a tacky surface, does not have surface hardness and cannot be configured in a colored form, is eliminated, on the one hand, owing to the fact that the binder, ethylene vinyl acetate copolymer, is blended with an ethylene polymer of ultra-high molecular weight and high density and that a filler of aluminum hydroxide is admixed to this binder mixture to the extent of 60% by weight. Moreover, processing aids, in the form of zinc stearate or sterically hindered phenols, are added. Pigment carriers, in the form of pigment granulates, are mixed in with this material to color it. To produce the covering, this starting material is melted and rolled out into sheets in known calender rolling mills and subsequently duplicated or triplicated as calendered product in order to obtain from the sheets, optionally also with different coloration, a usable floor covering with a defined thickness or to be able to apply these sheets on a nonwoven fabric and/or fabric substrate.

The sheets, so obtained, eliminate the tacky surface deficiency of the PVC-free material, namely of the pure ethylene vinyl acetate copolymer, without providing the conditions for the coloration of the surface. By duplicating sheets of different dyeing, it is admittedly possible to attain a colored construction. However, a colored patterning is excluded, since the sheets cannot be printed and can only be dyed by using colored granulates. Aside from the deficiency in the coloration, the floor covering from duplicated or triplicated sheets shows that the sheets can be separated once again when subjected to larger loads due to shear stresses.

For preparing a PVC-free floor covering from ethylene vinyl acetate copolymer, the DE 41 27 107 and the EP A 0 528 194 disclose a method, according to which the ethylene copolymer binder of very low density is mixed with 1% by weight of zinc stearate and a sterically hindered phenol and subsequently initially premixed while being heated and then thoroughly mixed. This plasticized mixture is subsequently drawn out into a sheet in calendering equipment. This sheet of ethylene copolymer is duplicated with heating with a sheet of ethylene vinyl acetate copolymer containing 8% polyethylene, which is produced using the same method. The multilayer sheet, obtained by this method, is used predominantly as a transparent covering layer for floor coverings. The multilayer sheet, produced by this method, is not sufficiently suitable as a floor covering because it cannot compete with a floor covering, produced on the basis of PVC, with respect to the possibility of a colored and patterned configuration. This multilayer sheet can therefore be used only as a covering layer for other softer plastic sheets. However, since the abrasion resistance of this multilayer sheet is also not adequate for floor coverings, the deficient wear resistance of PVC-free floor coverings is not eliminated with this proposed solution.

The DE 43 42 137 A1 discloses a method for producing multilayered plastic sheets or panels. These multilayered plastic sheets or panels consist of individual layers. At least one of the layers consist of an ethylene alkyl acrylate copolymer and the covering layer is transparent. This multilayered plastic sheet or panel can be patterned, this patterning being brought about by back-printing the transparent covering sheet and/or by printing the intermediate layer below the covering sheet. For the purpose of printing the transparent covering sheet or an intermediate layer, the latter is subjected to a corona discharge, which subjects the surface to a pretreatment so that it can absorb printing inks.

To produce these multilayered plastic sheets or panels, the individual layers are produced previously in individual sequences of operation in that the components of the layers are premixed and plasticized and the plasticized composition is subsequently brought in a simple manner into the form of a laminar layer. At least the intermediate layer or an underlayer is provided, if necessary, with a nonwoven or a reinforcing fabric. After a covering layer, an intermediate layer and an underlayer have been produced in separate sequences of the operation, the underside of the covering layer and/or the upper side of the intermediate layer below are printed. The intermediate layers, so obtained, are welded together in a known manner and the welded composite is optionally provided on the underside with a thermal insulation layer and/or a sound insulation layer.

To produce the individual sheets, the polymeric binder and the auxiliary materials, fillers etc., which may be used, are premixed and plasticized in equipment, such as an internal mixer, a twin screw extruder, a planetary screw extruder or rolling mills. Subsequently, the plasticized composition is processed with suitable machinery, such as calenders or twin belt presses, optionally together with a nonwoven or reinforcing fabric, into a layer of desired thickness. The combining of the individual sheets by welding is accomplished, for example, by means of an Auma or double belt press with a cooling zone, the latter being preferred because the problem of sticking to the machine is reduced. If necessary, a thermally insulating layer and/or a sound insulating layer can be applied subsequently or simultaneously in the usual manner to the underside of the plastic sheet.

These plastic sheets or panels have the disadvantage that the colored configuration and/or the colored patterning are constrained by the material and limited in the creative possibilities. Furthermore, the manufacturing process is very expensive, as are the products produced. The reason for the expensive manufacturing process lies therein that the individual layers must be produced separately as sheets and then welded together with input of heat energy. Furthermore, the pretreatment of the surface of the layers, by subjecting them to a corona discharge, which must be carried out a speed of 40 m/min, causes additional costs. Due to the layered constructions of these sheets or panels, the mechanical properties are limited and, if shear forces arise, the possibility exists that the individual layers will separate once again from one another.

Although environmentally compatible plastics are used instead of PVC for the manufacture of these multilayered sheets or panels, the latter do not have properties comparable to those of a PVC floor covering. These disadvantages arise out of the limited colored configuration and the patterning of the individual layers. Because of the layered construction, this sheet-shaped or panel-shaped material can only be subjected to limited mechanical loads, since the individual sheets could separate from one another when high shear forces occur. Moreover, the manufacturing process is very energy- and cost-intensive, since the individual layers must be produced separately, before they can be welded into multilayered sheets or panels.

Although many different methods have become known for the surface configuration of sheet-like formations from PVC-free plastic for floor coverings, the colored structures of the products so produced are not defined sharply. Satisfactory results with respect to the abrasion resistance and scratch resistance of these plastic sheets are also not obtained with these known manufacturing methods for configuring the surface.

The aim of the invention, on the one hand, is to avoid the danger to health and to the environment, which cannot be excluded completely when sheet-shaped floor coverings are used, which are produced from plasticizer-containing PVC-based materials. On the other, while using starting materials, which are free of chlorinated compounds and plasticizers, the aim is to retain the positive properties of PVC-based plastic sheets with respect to the wear resistance, the color and pattern configuration and the advantageous use properties, that is, the positive possibilities when laying. Furthermore, while using plastics free of chlorinated compounds, the aim is to assure a high use value of laminar constructions for floor coverings with respect to the flat behavior as well as the laying properties and, in addition to the required wear resistance, a high resistance to compressive and tensile stresses.

It is an object of the invention to develop a flexible, sheet-shaped, patterned configuration-containing laminar material, consisting of halogen compound-free plastics and having a wear-resistant surface, particularly for floor coverings, comprising a multi-component composite of at least two homogeneous materials, a homogeneous polymer or a polymer mixture with or without additives and a fiber-containing laminar material, which permits a surface configuration, for example, with respect to a pattern and the usable color, and an energy saving method for producing a sheet-shaped, heterogeneous, laminar, multi-component composite material.

This objective was accomplished owing to the fact that a multi-component composite material and a method for producing a laminar multi-component composite material from a halogen compound-free flexible plastic with a high mechanical resistance, suitable as a floor covering, was developed which, pursuant to the invention, has a heterogeneous construction and consists of at least one homogeneous, PVC-free, laminar polymer region, of a penetration region and of a laminar, fiber-containing base region, polymer from the polymer region being dispersed in the penetration region between the fibers of the base region up to a defined depth of the fiber-containing base region, there being a positive connection between the polymers and the fibers of the laminar, fiber-containing base region.

Furthermore, a multi-component composite material was developed from a halogen compound-free plastic with a wear-resistant surface which, pursuant to the invention, has a heterogeneous construction and consists of several, at least two, homogeneous, PVC-free polymer regions, a polymeric wear-resistant surface and a laminar, fiber-containing middle region. This laminar, fiber-containing middle region is provided between the polymeric wear-resistant surface and the polymer region and a penetration region extends between the polymer region and the wear-resistant surface, on the one hand, and the laminar, fiber-containing middle region, on the other. Between the fibers of the laminar, fiber-containing middle region, material intercalations are present on both sides up to a defined intercalation depth from the polymer region and from the wear-resistant surface. Within the laminar, fiber-containing middle region, there is a boundary layer of the two polymeric materials and the fibers of the laminar, fiber-containing middle region extend bridgelike between the two polymeric materials of the polymer region and the wear-resistant surface. The fibers form a positive connection with the material of the polymer region as well as with the wear-resistant surface.

Moreover, a multi-component composite material was developed from a flexible, halogen compound-free plastic with a wear-resistant surface, particularly for a colored or a colored, structured floor covering, for which the laminar, fiber-containing base region is provided with a certain configuration zone, consisting predominantly of colored motifs, and the polymer region is constructed as a transparent wear-resistant surface.

For this purpose, the laminar, fiber-containing middle region is provided with a certain configuration zone, which consists predominantly of colored motifs, and the polymeric region is transparent or colored and the wear-resistant surface is transparent or colored.

The laminar, fiber-containing base region or middle region, which serves as a bonding bridge and is provided between two homogeneous, PVC-free polymeric materials, which are incapable of bonding, is constructed as a configuration zone for the pattern, consisting of monochromatic or multicolored motifs, the laminar, fiber-containing base region or middle region consisting of one material, in which there are textile and/or mineral fibers in ordered or disordered fashion. The pattern of the configuration zone in the laminar, fiber-containing base region or the middle region consists of a partially laminar application of organic and/or inorganic pigments, contained in a thermoplastic binder, by a printing process on an inner surface of these regions. The fibers, on which the printed pattern is applied, are enclosed completely by polymer as configuration zone.

To ensure the abrasion resistance, the wear-resistant surface consists of a mixture of one or several olefin components and of one or several thermoplastic elastomeric components, the molecular groups of the components of the materials forming an interpenetrating network, in which the thermoplastic, elastomeric components are contained as the discontinuous phase and the olefin components as continuous phase.

Since the multi-component composite material, consisting of PVC-free polymer, cannot be laid on a plane surface, for example, by gluing so that it cannot slip, the laminar, fiber-containing base surface is constructed according to a further, inventive distinguishing feature especially as a bonding bridge between the polymer region and a laying plane for the multi-component composite material, which is built up pursuant to the invention and used as a floor covering.

Furthermore, the multi-component composite material has, pursuant to the invention, a laminar, fiber-containing region, which is constructed as a bonding bridge between two homogeneous, PVC-free polymers, which are incapable of bonding.

For configuring the surface, the wear-resistant surface of the flexible multi-component composite material has a relief-like structure, which preferably is formed by thermoplastic deformation.

Furthermore, the objective of developing a method for the production of the multi-component composite material, proposed here and constructed pursuant to the invention, was accomplished owing to the fact that a method for producing a heterogeneous, laminar multi-component composite material, consisting of at least one homogeneous, halogen compound-free plastic material and a fiber material, serving as configuration material and/or as a bonding bridge to a laying plane, is developed, for which a polymer is melted pursuant to the invention, a molten polymer is produced as a melt zone with a defined thickness from this polymer melt using molding equipment and, in the state of the thermoplastic melt, the polymer is introduced simultaneously with the laminar, fiber-containing base region or middle region which, on the surface facing the thermoplastic, polymer melt film, has no configuration or a colored and/or patterned configuration, into the jointing gap of a press consisting of at least two jointing means and, under the action of a linearly or laminarly generated force, exerted on the laminar, fiber-containing regions and the melt zone consisting of a polymer, a multi-component composite is formed by pressing the polymer out of the melt zone into the interstices of the fibers forming the fiber-containing regions up to a defined depth of the laminar fiber-containing regions with a positive adhesive bond between the polymer material and the fibers of the fiber-containing regions and the multi-component composite is subsequently cooled.

Furthermore, for producing a heterogeneous, multi-component composite material, consisting of at least two homogeneous, halogen compound-free plastic materials and a base region, consisting of a fiber material and constructed as a configuration zone and/or as a bonding bridge to a laying plane, a method is proposed, for which a polymer is melted pursuant to the invention, a laminar, preformed, polymer melt of defined thickness is produced from this polymer melt using molding equipment and, in the state of the laminarly preformed polymeric, thermoplastic melt, the polymer is introduced simultaneously with the laminar, fiber-containing base region or middle region, which consists of a nonwoven fabric and, on the surface facing the thermoplastic, polymer melt film, has a colored and/or patterned configuration, into the jointing gap of a press consisting of at least two jointing means and, under the effect of a linear or laminar force exerted on the laminar, fiber-containing base region or middle region and the laminarly preformed melt consisting of a polymer, a multi-component composite is formed by pressing the polymer out of the laminarly preformed melt into the interstices of the fibers forming the laminar, fiber-containing base region or middle region up to a defined depth of the laminar fiber-containing base region or middle region with a positive adhesive bond between the polymer material penetrating the fiber structure and the fibers and, subsequently, this multi-component composite material, employing the same processing technique, is provided with a further wear-resistant surface, the latter being applied in the thermoplastic melt state on the first polymer region of the multi-component composite material in the thermoplastic state and subsequently this adhesive bond is cooled.

Furthermore, the first, homogeneous PVC-free polymer region is produced by a known technique from a polymer melt and the latter, as a laminar, preformed melt in the thermoplastic state, is connected positively by jointing means exerting a contacting pressure on the one side with an unprinted fiber-containing, laminar base region, functioning as a bonding bridge to the laying plane, and, on the other side, with a fiber-containing, laminar and configurable middle region, serving as a bonding bridge between two polymeric materials of the polymer region, incapable of bonding, and the wear-resistant surface, whereby on the fiber-containing, laminar middle region, constructed as a bonding bridge, a further, homogeneous wear-resistant surface, which is produced with the same processing technique from a polymer melt and consists of a PVC-free polymer is introduced as a thermoplastic melt into the fiber structure of the fiber-containing laminar region by jointing means exerting a contacting pressure and a positive connection is produced as a bonding bridge with the fibers of the fiber-containing, laminar middle region.

For the further development of the proposed method for producing a heterogeneous multi-component composite material, a positive adhesive bond is produced in a separate process between a wear-resistant surface, consisting of a first homogeneous, PVC-free polymer and produced by a known technique from a polymer melt, and a printed middle region, functioning as a bonding bridge, in the thermoplastic state of the polymer melt under the action of a force exerted by jointing means and, subsequently, this multi-regional adhesive bond, consisting previously of a wear-resistant surface and a printed middle region and serving as a bonding bridge between two polymeric materials, which cannot be joined, is supplied simultaneously with a fiber-containing, laminar base region, functioning as adhesive bond to the laying plane, to a jointing gap of a press, consisting of at least two jointing means, a laminarly preformed polymer melt, produced in a known manner from a polymer melt, being introduced simultaneously in the thermoplastic state between the multi-regional adhesive bond and the fiber-containing laminar base region, a positive connection being produced between this fiber-containing, laminar base region and the polymer region of the adhesive bond, on the one hand, and the fiber-containing, laminar middle region, on the other.

For the colored configuration and pattern of the laminar, heterogeneous, multi-component composite material, the fiber-containing, laminar base region or the middle region, before being supplied with jointing mechanics to the jointing gap between two jointing means provided for this purpose, is printed over a part of its surface with a pattern consisting of colored motifs in a printing method using organic and/or inorganic pigments mixed into a thermoplastic polymer as binder. For this purpose, the fiber-containing laminar base region or the middle region is printed by a rotogravure method or a rotary screen printing method or a heat transfer method with a monochromatic or multicolored pattern consisting of motifs. For this purpose, the fiber-containing, laminar base region or the middle region, which is printed with a motif, is heated by the heated polymer melt, which is supplied to the jointing gap, that is, which is in the thermoplastic state and, by these means, the thermoplastic polymer, which is used as a binder for the printing inks, is fused on and thus integrated in a bonding manner in the positive bond between the fibers of the fiber-containing base region or the middle region and the polymer melt.

Furthermore, it was discovered that the following polymers are most suitable for the inventive construction and for realizing the proposed method.

For the transparent wear-resistant surface, a mixed copolymer with the following material composition and material properties, is used as polymer.

| | |
|---|---|
| Component 1: | Copolymeric polypropylene, preferably a grafted polymer of maleic anhydride grafted onto polypropylene. |
| Melting range: | 130° C.–180° C., preferably 150° C.–160° C. |
| Density (at 20° C.): | 0.8–0.95 g/cc, preferably 0.9–0.91 g/cc |
| Component 2: | Thermoplastic elastomeric compounds based on styrene-ethylene-butylene-CO block copolymers |
| Density (at 20° C.): | 0.85–0.95 g/cc, preferably 0.89–0.90 g/cc |

The two components of the mixture are present in the following amounts.

70% —% by weight of component 1
30% —% by weight of component 2 preferably
85–80% by weight of component 2
15–20% by weight of component 2

As material for the polymer region, which does not function as a transparent wear-resistant surface, a filled polymer of the following composition is used.

| | |
|---|---|
| Component 1: | Polyolefin elastomers, preferably copolymers of ethylene and components of the $C_4H_8$ to $C_6H_8$ series, preferably 1-octene |
| Melting range: | 80° C.–120° |
| Density range: | 0.80–9.0 g/cc, preferably 0.86–0.88 g/cc |
| Component 2: | Calcium carbonate, preferably a finely ground crystalline product |
| Density: | 2.60–2.90 g/cc, preferably 2.65–2.75 g/cc |
| Mohs hardness: | 2.90–3.10 |
| Component 3: | Magnesium hydroxide, more than 99% pure |
| Density: | 2.30–2.50 g/cc, preferably 2.4 |
| Moisture content: | Less than 1% by weight |
| Component 4: | Barium sulfate |
| Moisture content: | Less than 1% by weight |

Polymer mixture consisting of:
 component 1:30–40% by weight of polyolefin
 component 2:20–40% by weight of calcium carbonate
 component 3:10–40% by weight of magnesium hydroxide
 component 4:0–20% by weight of barium sulfate
The following polymer mixture is preferred
 component 1:30–35% by weight of polyolefin (1-octene copolymer with ethylene)
 component 2:30–40% by weight of calcium carbonate
 component 3:35–40% by weight of magnesium hydroxide With the construction of a flexible, sheet-shaped multi-component composite material of chlorine compound-free plastics, which is proposed pursuant to the invention and is to be used especially as a floor covering, a laminar material is available, which can be produced, on the one hand, with lower energy costs because of the manufacturing method, which is configured pursuant to the invention below and, on the other, less expensively because of the use of lower-cost materials and, at the same time, is of a high quality, which exceeds the known positive properties of floor coverings, produced on the basis of PVC, with respect to the flat behavior, the abrasion resistance of the surface of the floor covering, the resistance to tensile and compression loads and the resistance to solvents contained in cleaning agents. The high ability to absorb tensile and compressive loads, as well as the good flat behavior of the laminar material, are attributed to the laminar fiber layer or layers, which acts or act in the composite as surface reinforcement. Finally, there is much scope for producing a colored configuration and a configuration characterized by colored patterns. Moreover, due to the inventive construction, the possibility of a plastic motif configuration with effects is provided.

The invention will be described in greater detail in the following by means of an example. In the associated drawing, FIG. 1 shows a construction of a multi-component composite material, configured pursuant to the invention and shown in sectional representation and consisting of three regions, a base region, consisting of a fiber-containing fabric, a penetration region, consisting of fibers and polymer intercalations, in which there is a coloration and patterning zone, and a polymer region, which consists of a PVC-free binder and is constructed as a wear-resistant layer, FIG. 2 shows a sectional representation of a multi-component composite material, constructed pursuant to the invention and consisting of five regions, a fiber-containing middle region consisting of a fabric, an upper and lower penetration region, consisting of fibers and polymer intercalations, a coloring and pattern zone being provided in the upper penetration region, and an upper and lower polymer region, consisting of a PVC-free binder, a polymer or polymer mixture or a filled polymer, FIG. 3 shows a sectional representation of an inventively constructed multi-component composite material, consisting of seven regions, an upper fiber-containing middle region and a lower fiber-containing base region, each consisting of a fabric, an upper, middle and lower penetration region consisting of fiber and polymers intercalations, a coloring and pattern zone being disposed in the upper penetration region and an upper and lower polymer region, consisting of a PVC-binder, a polymer or polymer mixture or a filled polymer.

Figure 4:
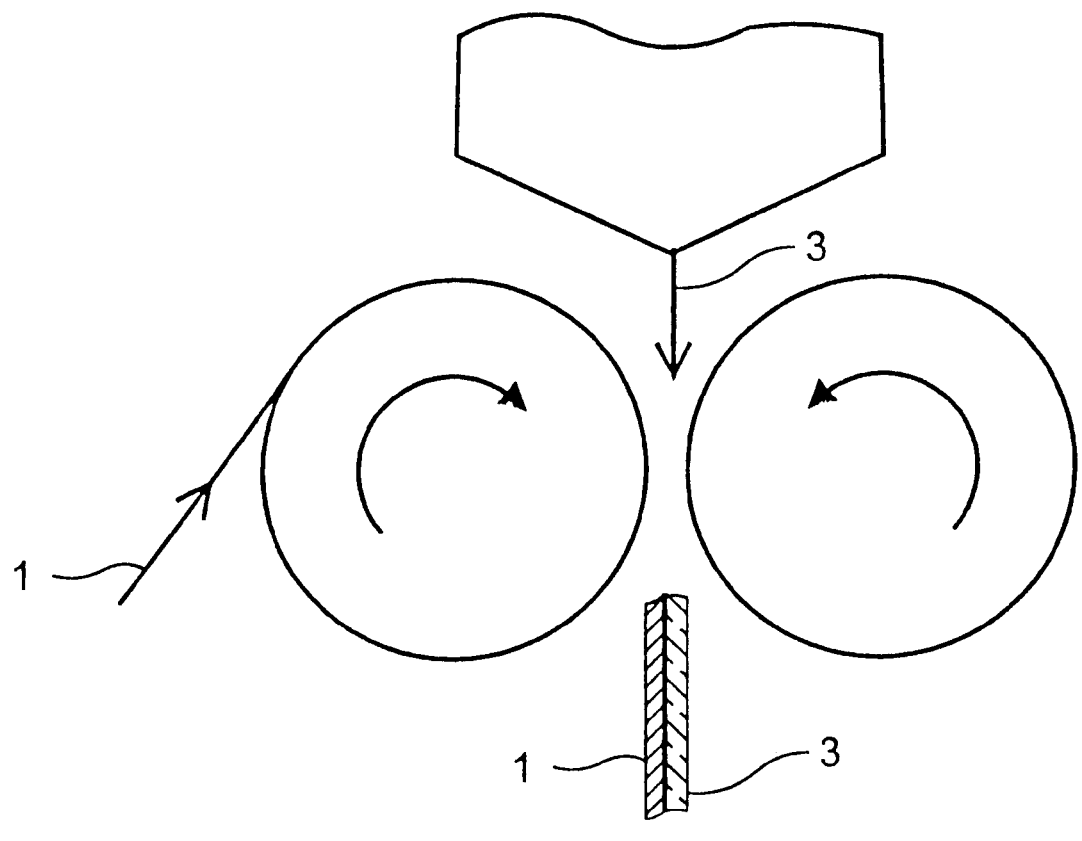
FIG. 4 is a schematic representation of the method of the invention, showing the polymer layer and a fibre-containing layer, being fed into a rolling mill, wherein the resulting product emerges from the mill, and is shown in detail below.
Figure 4:
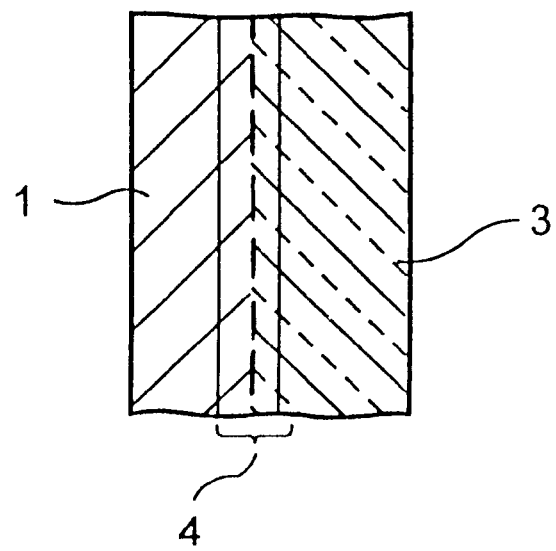
Figure 5:
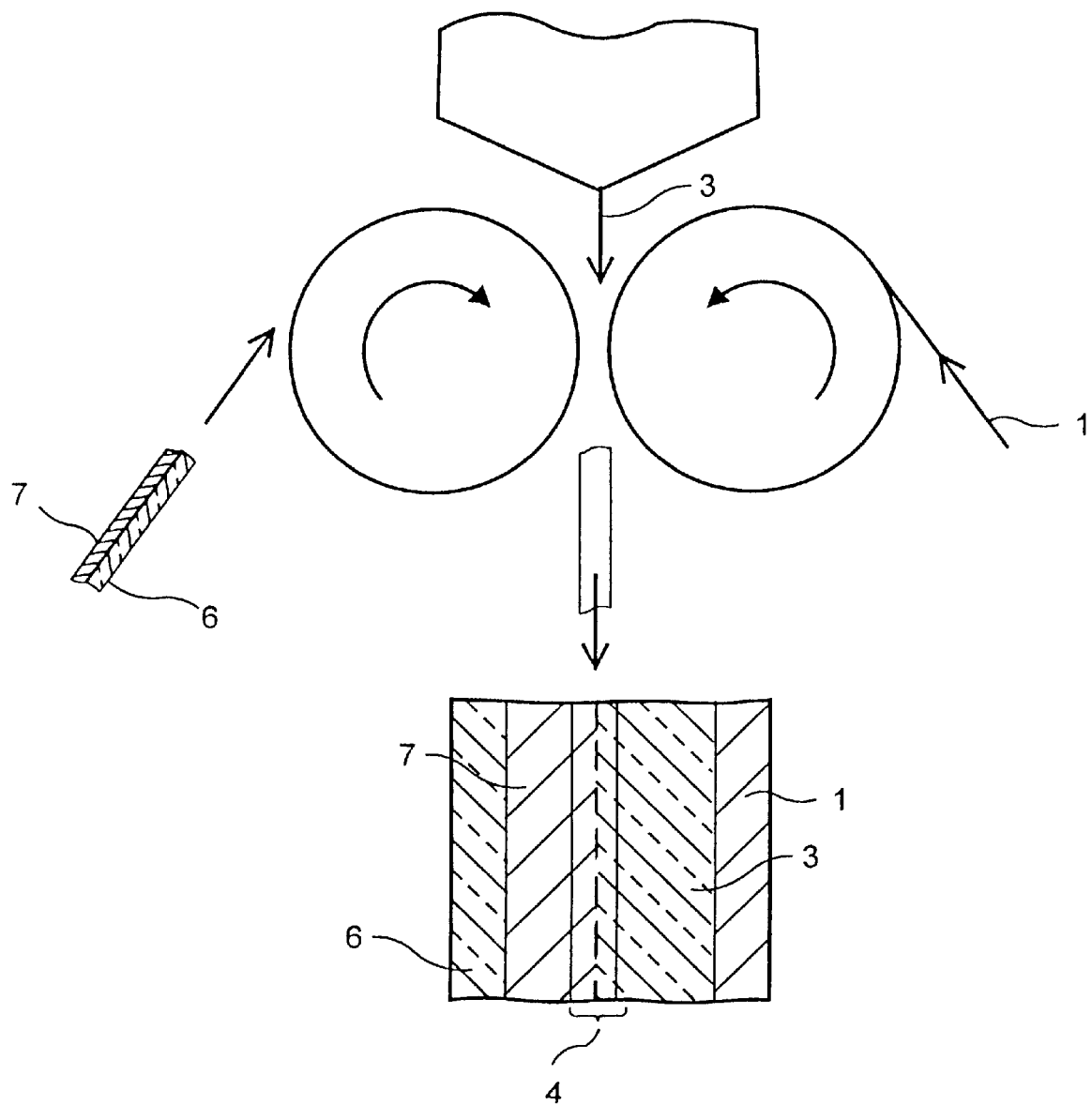
FIG. 5 is a schematic representation of the method of a second embodiment of the invention, showing the polymer layer and a pre-formed sheet consisting of a fibre-containing layer and a wear-resistant layer, being fed into a rolling mill, wherein the resulting product emerges from the mill, and is shown in detail below.

A sheet-shaped, flexible, multi-component composite material, which is used particularly for a monochromatic or multicolored, patterned or unpatterned floor covering, has a multi-regional construction. As the lowest region, a base region 1, which consists of a fiber-containing fabric and of ordered or disordered textile and/or mineral fibers, is frequently provided, which serves for bringing about the adhesion between the multi-component composite material and, on the one hand, the laying surface 2 and, on the other, a homogeneous, PVC-free thermoplastic polymer region 3. Between the laminar, fiber-containing base region 1 and the polymer region 3, there is a penetration region 4, which is formed by the diffusion of polymeric material from the polymer region 3 into the interstices (not shown) of the fibers (also not shown) of the fiber-containing fabric of the base region 1 up to a depth of at least 20%, which extends into the base region 1. In the present two-dimensional construction, the fiber-containing base region 1 is the carrier for a patterning configuration of the multi-component composite material, which is provided with monochromatic or multicolored motifs. This colored or patterned configuration is produced in a printing process on the fiber-containing fabric, which forms the base region 1, on or in the fibers and is represented there as a partially laminar configuration zone 5, consisting of inorganic and/or organic pigments contained in a thermoplastic binder. This configuration zone 5 is within the upper penetration region 4. The homogeneous thermoplastic polymer region 3, consisting of a PVC-free plastic, is constructed here as a transparent wear-resistant layer, which advantageously consists of a mixture or one or more olefin components and one or more thermoplastic elastomeric components in order to increase the abrasion resistance. In this mixture, the molecular groups of the material components form an interpenetrating network, in which the thermoplastic elastomeric components are contained as the discontinuous phase and the olefinic components as the continuous phase.

For a three-dimensional construction of the multi-component composite material, which is selected predominantly for a monochromatic configuration and formed from a base region 1, which consists of a fiber-containing fabric, a penetration region 4 and a polymer region 3, a wear-resistant layer 6 of PVC-free plastic is provided on the polymer region 3. Unless the materials used for the wear-resistant surface 6 and the polymer region 3 can be combined/joined with the known means on the basis of their material properties, a fiber-containing middle region 7, the construction of which corresponds to that of the base region 1, is provided between the polymeric wear-resistant surface 6 and the polymer region 3. In the same way as the fiber-containing base region 1, the fiber-containing middle region 7 can be used as carrier of a configuration/patterning zone 5 in the multi-component composite material, consisting of monochromatic or multicolored motifs. On either side of the fiber-containing middle region 7, a penetration region 4 is formed between the fiber-containing middle region 7 and the in each case adjoining polymer region 3 or the wear-resistant surface 6, which consists of PVC-free plastic. As already mentioned above, polymer from the polymer region 3 or the wear-resistant surface 6 is diffused into the interstices between the fiber material in this penetration region 4 and forms here, due to the diffusion of polymers into the fiber matrix, a positive adhesive bond between the fiber surface and the polymer.

If necessary, the wear-resistant surface 6 is provided on its surface 8 with a relief-like structure (not shown), which preferably is formed by thermoplastic deformation.

The inventive, sheet-shaped, flexible multi-component composite material is produced preferably in conventional multi-roller mills. In the case of a multi-component composite material with a tri-regional construction, on the one hand, the fiber-containing material of a base 1 or a middle region 7 and, on the other, simultaneously, a polymer, which was melted immediately previously in an extruder, are supplied as a thermoplastic melt over molding equipment as melt surface for a polymer region 3 or a wear-resistant surface 6 to the gap (not shown) between a pair of rollers (which is also not shown). By a contacting pressure exerted by the rollers, on the one hand, on the fiber-containing material of the base region 1 or a middle region 7 and, on the other, on the laminarly preformed, fused polymer for the polymer region 3 or the wear-resistant surface 6, having a defined melt viscosity controlled by pressure and temperature, polymer is diffused into the interstices between the fibers of the fiber-containing material of the base region 1 or the middle region 7 and combined positively with one another in a penetration region 4.

As polymer for the transparent wear-resistant surface 6, a polymer mixture with the following material composition and properties is used.

| | |
|---|---|
| Component 1: | Copolymeric polypropylene, preferably a graft copolymer of maleic anhydride, grafted onto polypropylene. |
| Melting Range: | 130° C.–180° C., preferably 150° C.–160° C. |
| Density (at 20° C.): | 0.8–0.95 g/cc, preferably 0.9–0.91 g/cc |
| Component 2: | Thermoplastic elastomeric compounds based on a styrene-ethylene-butylene-CO block copolymer |
| Density (at 20° C.): | 0.85–0.95 g/cc, preferably 0.89–0.90 g/cc |

The mixture of the two components is present in the following composition ranges.

70% —% by weight of component 1

30% —% by weight of component 2 preferably

85–80% by weight of component 2
15–20% by weight of component 2

As material for the polymer region, which does not function as a transparent wear-resistant surface, a filled polymer of the following composition is used.

| | |
|---|---|
| Component 1: | Polyolefin elastomers, preferably copolymers of ethylene and components of the $C_4H_8$ to $C_6H_8$ series, preferably 1-octene |
| Melting range: | 80° C.–120° C. |
| Density range: | 0.80–9.0 g/cc, preferably 0.86–0.88 g/cc |
| Component 2: | Calcium carbonate, preferably a finely ground crystalline product |
| Density: | 2.60–2.90 g/cc, preferably 2.65–2.75 g/cc |
| Mohs hardness: | 2.90–3.10 |
| Component 3: | Magnesium hydroxide, more than 99% pure |
| Density: | 2.30–2.50 g/cc, preferably 2.4 |
| Moisture content: | Less than 1% by weight |
| Component 4: | Barium sulfate |
| Moisture content: | Less than 1% by weight |

Polymer mixture consisting of:
  component 1:30–40% by weight of polyolefin
  component 2:20–40% by weight of calcium carbonate
  component 3:10–40% by weight of magnesium hydroxide
  component 4:0–20% by weight of barium sulfate
The following polymer mixture is preferred
  component 1:30–35% by weight of polyolefin (1-octene copolymer with ethylene)
  component 2:30–40% by weight of calcium carbonate
  component 3:35–40% by weight of magnesium hydroxide

We claim:

1. A method for producing a laminar, heterogeneous multi-component composite material comprising
   at least one homogeneous and halogen compound-free polymer and
   at least one laminar, fiber-containing layer having a printable upper surface, said fiber-containing layer being formed of non-woven fibers having interstices therebetween, the method comprising the steps of, in sequence:
   (a) melting a first polymer in the form of a melted first polymer layer of defined thickness,
   (b) applying the melted first polymer layer onto the upper surface of a first fiber-containing layer simultaneously with introducing the melted first polymer layer and first fiber-containing layer into a gap between two rollers of a rolling mill,
   (c) pressing the two layers together in the rolling mill so as to force the melted first polymer from a position on the upper surface of the first fiber-containing layer, and into the interstices of the first fiber-containing layer up to a pre-selected depth of the first fiber-containing layer, and
   (d) cooling to form a positive adhesive bond between the first polymer and the fibers to form a first composite material.

2. The method of claim 1, further comprising the steps of, following step (d):
   (e) melting a second polymer in the form of a melted polymer layer of defined thickness,
   (f) heating the first composite material so that the first polymer is in a thermoplastic state,
   (g) applying the melted second polymer layer onto an upper surface of the first polymer layer of the first composite material simultaneously with introducing the melted second polymer layer and the heated first composite material into a gap between two rollers of a rolling mill,
   (h) pressing the second polymer layer and the first composite material together in the rolling mill, and
   (i) cooling to form a positive adhesive bond between the second polymer and the first composite material whereby the second polymer forms a wear-resistant surface on the first composite material.

3. The method of claim 1, further comprising the steps of, following step (d):
   (e) melting a third polymer in the form of a melted polymer layer of defined thickness,
   (f) heating the first composite material so that the first polymer is in a thermoplastic state,
   (g) applying the melted third polymer layer onto the upper surface of a second fiber-containing layer and onto a lower surface of the first fiber-containing layer, simultaneously with introducing the melted third polymer layer and second fiber-containing layer, along with the heated first composite material, into a gap between two rollers of a rolling mill,
   (h) pressing the layers together in the rolling mill so as to force the melted third polymer from a position on the upper surface of the second fiber-containing layer and the lower surface of the first fiber-containing layer, and into the interstices of the first and second fiber-containing layer up to respective pre-selected depths of the first and second fiber-containing layers, and
   (i) cooling to form a positive adhesive bond between the third polymer and the fibers of the first and second fiber-containing layers to form a second composite material, wherein the first polymer layer forms a wear-resistant surface.

4. The method of claim 1, wherein a lower side of the fiber-containing layer is mountable on a support surface.

5. The method of claim 3, wherein a lower side of the second fiber-containing layer is mountable on a support surface.

6. The method of claim 1, wherein the fiber-containing layer is pre-printed with a pattern comprising pigment mixed into a thermoplastic polymer binder, and whereby the thermoplastic binder is heated, pressed and cooled as a result of steps (b) through (d), such that said binder is integrated among the fibers of the fiber-containing layer and forms a positive bond between said fibers and the polymer layer.

* * * * *